United States Patent
Wu et al.

(10) Patent No.: US 12,205,345 B2
(45) Date of Patent: Jan. 21, 2025

(54) IMAGE COMPARISON METHOD AND COMPUTING DEVICE UTILIZING METHOD

(71) Applicant: HON HAI PRECISION INDUSTRY CO., LTD., New Taipei (TW)

(72) Inventors: Chung-Yu Wu, New Taipei (TW); Chin-Pin Kuo, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 516 days.

(21) Appl. No.: 17/562,284

(22) Filed: Dec. 27, 2021

(65) Prior Publication Data
US 2022/0207859 A1    Jun. 30, 2022

(30) Foreign Application Priority Data
Dec. 28, 2020 (CN) .......................... 202011585075.2

(51) Int. Cl.
*G06V 10/75* (2022.01)
*G06V 10/44* (2022.01)

(52) U.S. Cl.
CPC ............ *G06V 10/751* (2022.01); *G06V 10/44* (2022.01)

(58) Field of Classification Search
CPC ............ G06T 2207/30148; G06T 7/13; G06T 2207/30141; G06T 5/30; G06T 2207/20036; G06V 10/751; G06V 10/761
See application file for complete search history.

(56) References Cited

U.S. PATENT DOCUMENTS

| | | | | |
|---|---|---|---|---|
| 5,953,461 A | * | 9/1999 | Yamada | G06T 5/70 382/266 |
| 6,888,958 B1 | * | 5/2005 | Sawa | G06T 7/32 382/209 |
| 10,475,179 B1 | * | 11/2019 | Bishop | G06T 7/13 |
| 12,007,320 B2 | * | 6/2024 | Chou | G01N 21/658 |

(Continued)

FOREIGN PATENT DOCUMENTS

| | | | | |
|---|---|---|---|---|
| CN | 107492091 | | 12/2017 | |
| CN | 112085709 A | * | 12/2020 | ............. G06F 18/22 |
| JP | 4357666 B2 | * | 11/2009 | ............. G06T 7/001 |

OTHER PUBLICATIONS

Yu-Kang Chang, Master Thesis of Central South University "Automatic Optical Inspection System for Detecting Defects on PCB Film" Published on Jul. 31, 2003.

(Continued)

*Primary Examiner* — Shaghayegh Azima
(74) *Attorney, Agent, or Firm* — ScienBiziP, P.C.

(57) ABSTRACT

In an image comparison method, an original reference image and an original test image are obtained. The original reference image and the original test image are binarized to obtain a reference binary image and a test binary image. The reference binary image and the test binary image are detected edges to obtain a reference edge image and a test edge image. A morphological expansion is performed on the reference edge image to obtain an expanded reference edge image. An OR operation is performed on the extended reference edge image and the test edge image to obtain an extended test edge image. An XOR operation is performed on the expanded reference edge image and the expanded test edge image. The method improves the accuracy of image comparison.

17 Claims, 3 Drawing Sheets

(56) References Cited

U.S. PATENT DOCUMENTS

2011/0133887 A1* 6/2011 Tian .................. G06V 30/1448
382/284
2020/0126242 A1* 4/2020 Fang ...................... G06T 7/337

OTHER PUBLICATIONS

Wen-Wei Yao, Master Thesis of Kunming University of Science and Technology "Research on Defects Detection Technology and System of Printed Circuit Board" Published on Dec. 15, 2012.

* cited by examiner

IMAGE COMPARISON METHOD AND COMPUTING DEVICE UTILIZING METHOD

FIELD

The subject matter herein generally relates to image processing, specifically an image comparison method, an image comparison system, an computing device, and a computer storage medium.

BACKGROUND

One of the simplest methods of image comparison is to compare pixel values of an image to pixel values of another image. However, sometimes, a user is only interested in appearances of objects in the images and wants to ignore other differences between the images. In this case, the method to compare pixel values of each pixel of two images may be improper.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

The image comparison method may be executed by one or more computing devices. The computing device may be a device that can automatically perform numerical calculation and/or information processing according to preset or stored instructions, and hardware of the computing device may include, but is not limited to, a microprocessor, an application specific integrated circuit (ASIC), a field-programmable gate array (FPGA), a digital signal processor (DSP), an embedded device, etc.

The computing device may be a desktop computer, a notebook, a palmtop computer, and a cloud server. The computing device can interact with a user through a keyboard, a mouse, a remote control, a touchpad, or a voice control device.

Embodiment 1

Figure 1:
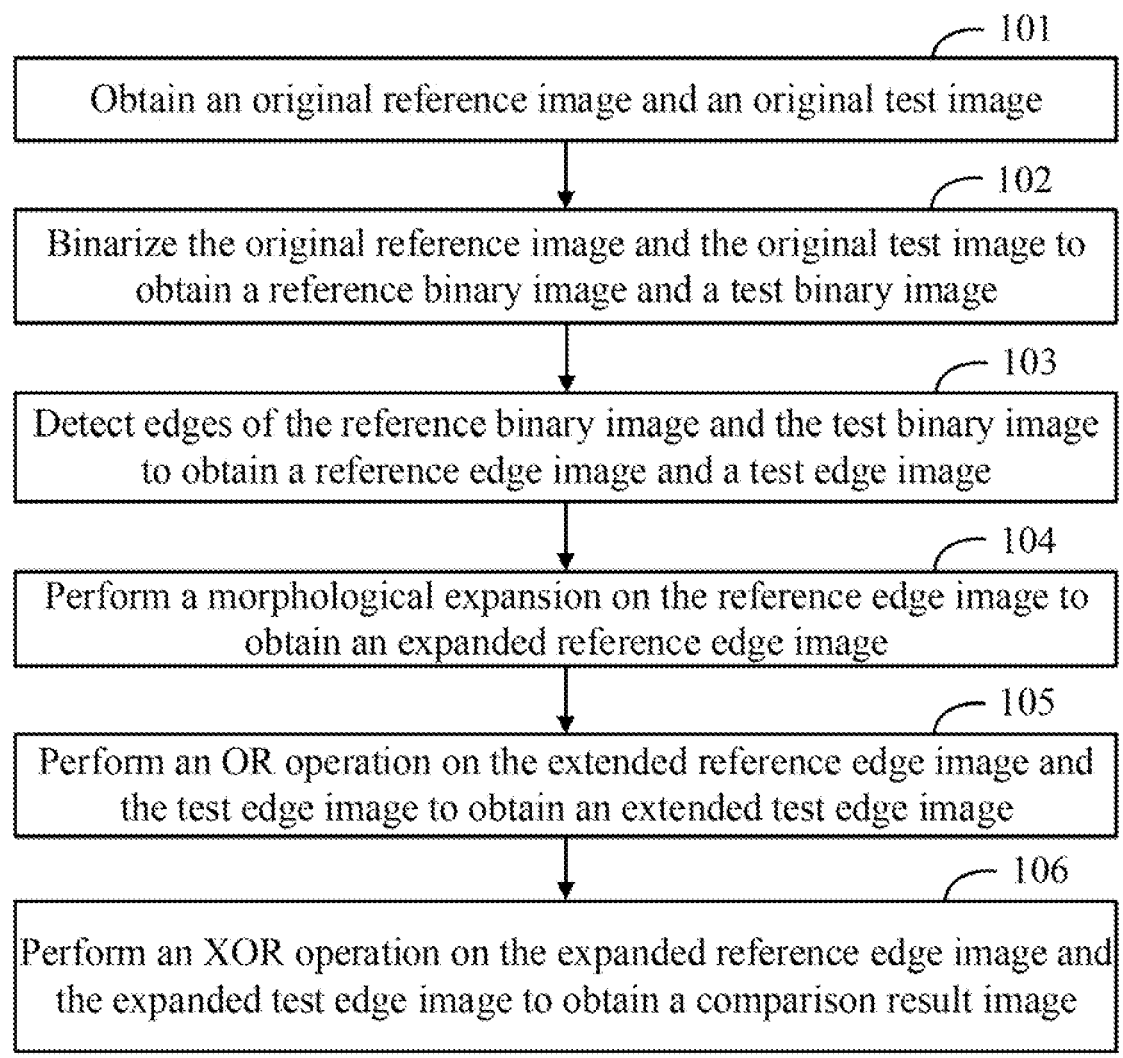
FIG. 1 is a flowchart of an image comparison method provided in one embodiment of the present disclosure.

FIG. 1 is a flowchart of an image comparison method in one embodiment. The method is applied to a computing device. The method is used to compare images and improves an accuracy of image comparison. According to different requirements, the order of the steps in the flowchart may be changed, and some steps may be omitted.

In block 101, the computing device obtains an original reference image and an original test image.

The original reference image and the original test image can be uploaded by a user, and the computing device receives the original reference image and the original test image. The original reference image and original test image can be read from an image database. The original reference image and the original test image can be captured by an image capturing device.

In one embodiment, the original reference image can be an image of a reference product, and the original test image can be an image of a test product. The original reference image and the original test image can be compared to determine whether the test product is qualified.

In block 102, the computing device binarizes the original reference image and the original test image to obtain a reference binary image and a test binary image.

For example, the computing device obtains a preset value and a pixel value of each pixel in the original reference image. If the pixel value of the original reference image is smaller than the preset value, the computing device sets the pixel value of the original reference image to be 0. If the pixel value of the original reference image is larger than the preset value, the computing device sets the pixel value of the original reference image to be 1. Similarly, the computing device obtains a pixel value of each pixel in the original test image. If the pixel value of the test reference image is smaller than the preset value, the computing device sets the pixel value of the original test image to be 0. If the pixel value of the original test image is larger than the preset value, the computing device sets the pixel value of the original test image to be 1.

In one embodiment, before binarizing the original reference image and the original test image, the computing device may further convert the original reference image and the original test image into grayscale images.

In one embodiment, before binarizing the original reference image and the original test image, the computing device may further align the original reference image and the original test image.

The computing device may align the original reference image and the original test image based on pixel points in upper left corners of the original reference image and the original test image. After alignment, each pixel of the original reference image corresponds to an pixel of the original test image.

In block 103, the computing device detects edges of the reference binary image and the test binary image to obtain a reference edge image and a test edge image.

In one embodiment, a method of detecting edges of the reference binary image and the test binary image includes: detecting the edges of the reference binary image and the test binary image using a Canny edge detection algorithm.

In the process of detecting edges of the reference binary image using the Canny edge detection algorithm, the reference binary image is denoised by at least one Gaussian filter. A gradient value and a direction of each pixel of the reference binary image are calculated. Non-edge pixels in the reference binary image are filtered using a non-maximum suppression (NMS) according to the gradient value and the direction of each pixel of the reference binary image.

Edge pixels are determined according to the gradient value of each pixel of the reference binary image using a double-threshold detection method.

In block 104, the computing device performs a morphological expansion on the reference edge image to obtain an expanded reference edge image.

A method of performing a morphological expansion on the reference edge image may include: obtaining a preset structural element; and performing the morphological expansion on the reference edge image through the preset structural element.

The preset structure element may be a 3-dimensional square matrix, and each value in the square matrix may be 1.

A method of performing the morphological expansion on the reference edge image through the preset structural element may include: obtaining an origin of the preset structural element; reflecting the preset structural element on the origin to obtain a reflection set; translating the reflection set by a preset displacement threshold on the reference edge image, and determining a number of non-zero common elements of the reflection set and the reference edge image; and setting a pixel value of a current position of the origin to be 1 when the number of non-zero common elements of the reflection set and the reference edge image is greater than zero.

In block 105, the computing device performs an OR operation on the extended reference edge image and the test edge image to obtain an extended test edge image.

In one example, the expanded reference edge image includes four pixels, and pixel values of the four pixels are 0, 1, 0, and 1. The test edge image also includes four pixels (the four pixels of the expanded reference edge image correspond to the four pixels of the test edge image), and pixel values of the four pixels are 1, 0, 0, and 1. Pixel values of four pixels of extended test edge image are 1, 1, 0, and 1.

In another example, the expanded reference edge image includes four pixels, and pixel values of the four pixels are 1, 1, 0, and 1. The test edge image also includes four pixels, and pixel values of the four pixels are 1, 0, 0, and 1. Pixel values of four pixels of extended test edge image are 1, 1, 0, and 1.

In block 106, the computing device performs an XOR (exclusive-OR) operation on the expanded reference edge image and the expanded test edge image to obtain a difference image.

In one example, the expanded reference edge image includes four pixels, and pixel values of the four pixels are 0, 1, 0, and 1. The expanded test edge image includes four pixels (the four pixels of the expanded reference edge image correspond to the four pixels of the expanded test edge image one-to-one), and pixel values of the four pixels are 1, 1, 0, and 1. Pixel values of four pixels of the difference image are 1, 0, 0, and 0.

In another example, the expanded reference edge image includes four pixels, and pixel values of the four pixels are 1, 1, 0, and 1. The expanded test edge image includes four pixels, and pixel values of the four pixels are 1, 1, 0, and 1. Pixel values of four pixels of the difference image are 0, 0, 0, and 0.

In another embodiment, the original reference image is an image of a reference product, the original test image is an image of a test product, and the image comparison method may further include: determining whether the original test image is same as the original reference image according to the difference image; when the original test image is same as the original reference image, determining that the test product is qualified; and when the original reference image is not same as the original test image, determining that test product is unqualified.

In another embodiment, a method of determining whether the original test image is same as the original reference image according to the difference image may include: obtaining a preset threshold; calculating a sum of pixel values of the difference image; when the sum is greater than the preset threshold, determining that the original test image is not the same as the original reference image; and when the sum is less than or equal to the preset threshold, determining that the original test image is same as the original reference image.

The image comparison method of the first embodiment reduces the rate of errors caused by external factors through edge detection and morphological expansion, and improves the accuracy of image comparison.

Embodiment 2

Figure 2:
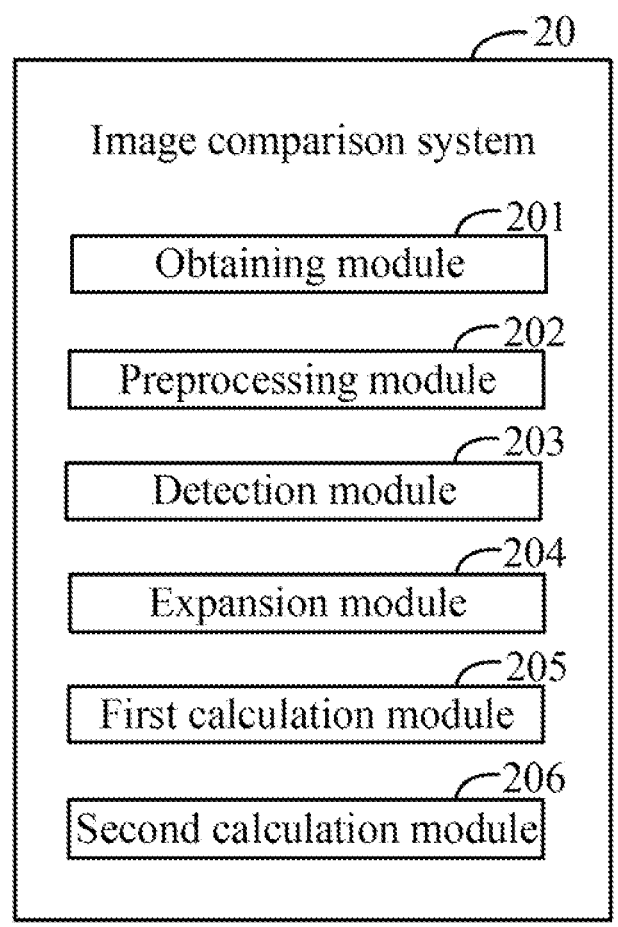
FIG. 2 is a block diagram of an image comparison system provided in one embodiment of the present disclosure.

FIG. 2 is a block diagram of an image comparison system provided in one embodiment of the present disclosure. The image comparison system 20 is applied to a computing device. The image comparison system is used to compare images and improves an accuracy of image comparison.

As shown in FIG. 2, the image comparison system 20 may include an obtaining module 201, a preprocessing module 202, a detection module 203, an expansion module 204, a first calculation module 205, and a second calculation module 206.

The obtaining module 201 is configured to obtain an original reference image and an original test image.

The original reference image and the original test image can be uploaded by a user, and the obtaining module 201 receives the original reference image and the original test image. The original reference image and original test image can be read from an image database. The original reference image and the original test image can be captured by an image capturing device.

In one embodiment, the original reference image can be an image of a reference product, and the original test image can be an image of a test product. The original reference image and the original test image can be compared to determine whether the test product is qualified.

The preprocessing module 202 is configured to binarize the original reference image and the original test image to obtain a reference binary image and a test binary image.

For example, the preprocessing module 202 obtains a preset value and a pixel value of each pixel in the original reference image. If the pixel value of the original reference image is smaller than the preset value, the preprocessing module 202 sets the pixel value of the original reference image to be 0. If the pixel value of the original reference image is larger than the preset value, the preprocessing module 202 sets the pixel value of the original reference image to be 1. Similarly, the preprocessing module 202 obtains a pixel value of each pixel in the original test image. If the pixel value of the test reference image is smaller than the preset value, the preprocessing module 202 sets the pixel value of the original test image to be 0. If the pixel value of the original test image is larger than the preset value, the preprocessing module 202 sets the pixel value of the original test image to be 1.

In one embodiment, before binarizing the original reference image and the original test image, the preprocessing module 202 may further converts the original reference image and the original test image into grayscale images.

In one embodiment, before binarizing the original reference image and the original test image, the preprocessing module 202 may further align the original reference image and the original test image.

The preprocessing module 202 may align the original reference image and the original test image based on pixel points in upper left corners of the original reference image and the original test image. After alignment, each pixel of the original reference image corresponds to a pixel of the original test image.

The detection module 203 is configured to detect edges of the reference binary image and the test binary image to obtain a reference edge image and a test edge image.

In one embodiment, a method of detecting edges of the reference binary image and the test binary image includes: detecting the edges of the reference binary image and the test binary image using a Canny edge detection algorithm.

In the process of detecting edges of the reference binary image using the Canny edge detection algorithm, the reference binary image is de-noised by at least one Gaussian filter. A gradient value and a direction of each pixel of the reference binary image are calculated. Non-edge pixels in the reference binary image are filtered using a non-maximum suppression (NMS) according to the gradient value and the direction of each pixel of the reference binary image. Edge pixels are determined according to the gradient value of each pixel of the reference binary image using a double-threshold detection method.

The expansion module 204 is configured to perform a morphological expansion on the reference edge image to obtain an expanded reference edge image.

A method of performing a morphological expansion on the reference edge image may include: obtaining a preset structural element; and performing the morphological expansion on the reference edge image through the preset structural element.

The preset structure element may be a 3-dimensional square matrix, and each value in the square matrix may be 1.

A method of performing the morphological expansion on the reference edge image through the preset structural element may include: obtaining an origin of the preset structural element; reflecting the preset structural element on the origin to obtain a reflection set; translating the reflection set by a preset displacement threshold on the reference edge image, and determining a number of non-zero common elements of the reflection set and the reference edge image; and setting a pixel value of a current position of the origin to be 1 when the number of non-zero common elements of the reflection set and the reference edge image is greater than zero.

The first calculation module 205 is configured to perform an OR operation on the extended reference edge image and the test edge image to obtain an extended test edge image.

In one example, the expanded reference edge image includes four pixels, and pixel values of the four pixels are 0, 1, 0, and 1. The test edge image also includes four pixels (the four pixels of the expanded reference edge image correspond to the four pixels of the test edge image), and pixel values of the four pixels are 1, 0, 0, and 1. Pixel values of four pixels of extended test edge image are 1, 1, 0, and 1.

In another example, the expanded reference edge image includes four pixels, and pixel values of the four pixels are 1, 1, 0, and 1. The test edge image also includes four pixels, and pixel values of the four pixels are 1, 0, 0, and 1. Pixel values of four pixels of extended test edge image are 1, 1, 0, and 1.

The second calculation module 206 is configured to performs an XOR operation on the expanded reference edge image and the expanded test edge image to obtain a difference image.

In one example, the expanded reference edge image includes four pixels, and pixel values of the four pixels are 0, 1, 0, and 1. The expanded test edge image includes four pixels (the four pixels of the expanded reference edge image correspond to the four pixels of the expanded test edge image one-to-one), and pixel values of the four pixels are 1, 1, 0, and 1. Pixel values of four pixels of the difference image are 1, 0, 0, and 0.

In another example, the expanded reference edge image includes four pixels, and pixel values of the four pixels are 1, 1, 0, and 1. The expanded test edge image includes four pixels, and pixel values of the four pixels are 1, 1, 0, and 1. Pixel values of four pixels of the difference image are 0, 0, 0, and 0.

In another embodiment, the original reference image is an image of a reference product, the original test image is an image of a test product, and the image comparison method may further include: determining whether the original test image is same as the original reference image according to the difference image; when the original test image is same as the original reference image, determining that the test product is qualified; and when the original reference image is not the same as the original test image, determining that test product is unqualified.

In another embodiment, a method of determining whether the original test image is same as the original reference image according to the difference image may include: obtaining a preset threshold; calculating a sum of pixel values of the difference image; when the sum is greater than the preset threshold, determining that the original test image is not the same as the original reference image; and when the sum is less than or equal to the preset threshold, determining that the original test image is same as the original reference image.

The image comparison system 20 of the second embodiment reduces the error rate caused by external factors through edge detection and morphological expansion, and improves the accuracy of image comparison.

Embodiment 3

The embodiment provides a storage medium on which a computer program is stored. When the computer program is executed by a processor, the blocks in the embodiment of the image comparison method may be implemented, such as 101 to 106 in FIG. 1.

In block 101, the computing device obtains an original reference image and an original test image;

In block 102, the computing device binarizes the original reference image and the original test image to obtain a reference binary image and a test binary image;

In block 103, the computing device detects edges of the reference binary image and the test binary image to obtain a reference edge image and a test edge image;

In block 104, the computing device performs a morphological expansion on the reference edge image to obtain an expanded reference edge image;

In block 105, the computing device performs an OR operation on the extended reference edge image and the test edge image to obtain an extended test edge image; and In block 106, the computing device performs an XOR operation on the expanded reference edge image and the expanded test edge image to obtain a difference image.

Alternatively, when the computer program is executed by the processor, the functions of the image comparison system may be implemented, such as the modules 201 to 206 in FIG. 2.

The obtaining module 201 is configured to obtain an original reference image and an original test image.

The preprocessing module 202 is configured to binarize the original reference image and the original test image to obtain a reference binary image and a test binary image.

The detection module 203 is configured to detect edges of the reference binary image and the test binary image to obtain a reference edge image and a test edge image.

The expansion module 204 is configured to perform a morphological expansion on the reference edge image to obtain an expanded reference edge image.

The first calculation module 205 is configured to perform an OR operation on the extended reference edge image and the test edge image to obtain an extended test edge image.

The second calculation module 206 is configured to performs an XOR operation on the expanded reference edge image and the expanded test edge image to obtain a difference image.

Embodiment 4

Figure 3:
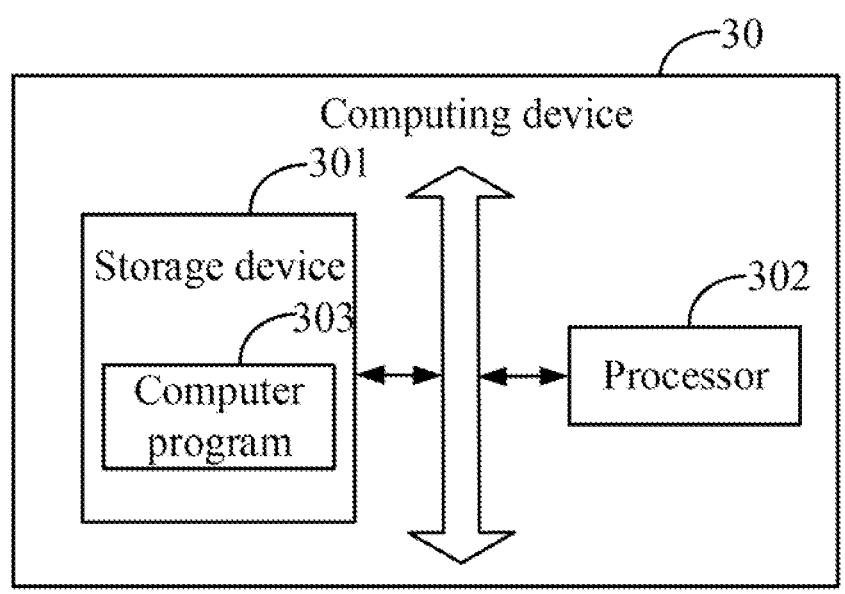
FIG. 3 is a block diagram of an computing device implementing the image comparison method in one embodiment of the present disclosure.

FIG. 3 is a block diagram of a computing device implementing the image comparison method in one embodiment of the present disclosure. The computing device 30 may include a storage device 301, a processor 302, and a computer program 303, such as an image comparison program stored in the storage device 301 and executable by the processor 302. The processor 302 may execute the computer program 303 to implement the blocks in the image comparison method described above, such as the blocks 101 to 106 in FIG. 1. Alternatively, the processor 302 may execute the computer program 303 to implement the functions of the image comparison system described above, such as the modules 201 to 206 in FIG. 2.

In block 101, the computing device obtains an original reference image and an original test image;

In block 102, the computing device binarizes the original reference image and the original test image to obtain a reference binary image and a test binary image;

In block 103, the computing device detects edges of the reference binary image and the test binary image to obtain a reference edge image and a test edge image;

In block 104, the computing device performs a morphological expansion on the reference edge image to obtain an expanded reference edge image;

In block 105, the computing device performs an OR operation on the extended reference edge image and the test edge image to obtain an extended test edge image; and In block 106, the computing device performs an XOR operation on the expanded reference edge image and the expanded test edge image to obtain a difference image.

Alternatively, the processor 302 may execute the computer program 303 to implement the functions of the image comparison system described above, such as the modules 201-206 in FIG. 2.

The obtaining module 201 is configured to obtain an original reference image and an original test image.

The preprocessing module 202 is configured to binarize the original reference image and the original test image to obtain a reference binary image and a test binary image.

The detection module 203 is configured to detect edges of the reference binary image and the test binary image to obtain a reference edge image and a test edge image.

The expansion module 204 is configured to perform a morphological expansion on the reference edge image to obtain an expanded reference edge image.

The first calculation module 205 is configured to perform an OR operation on the extended reference edge image and the test edge image to obtain an extended test edge image.

The second calculation module 206 is configured to performs an XOR operation on the expanded reference edge image and the expanded test edge image to obtain a difference image.

In an exemplary embodiment, the computer program 303 may be divided into one or more modules, and the one or more modules are stored in the storage device 301 and executed by the processor 302 to complete the image comparison method of the present disclosure. The one or more modules can be a series of computer-readable instruction segments capable of performing specific functions, and the instruction segments are used to describe execution processes of the computer program 303 in the computing device 30. For example, the computer program 303 can be divided into the obtaining module 201, the preprocessing module 202, the detection module 203, the expansion module 204, the first calculation module 205, and the second calculation module 206 in FIG. 2.

The computing device 30 may be a desktop computer, a notebook, a palmtop computer, or a cloud server. Those skilled in the art will understand that the block diagram is only an example of the computing device 30, and does not constitute a limitation on the computing device 30. Other examples of the computing device 30 may include more or fewer components than shown in FIG. 3, or combine some components or have different components. For example, the computing device 30 may further include an input/output device, a network access device, a bus, and the like.

The processor 302 may be a central processing unit (CPU), other general-purpose processors, a digital signal processors (DSP), an application specific integrated circuit (ASIC), a field-programmable gate array (FPGA) or other programmable logic devices, discrete gates or transistor logic devices, discrete hardware components, etc. The general-purpose processor can be a microprocessor or the processor 302 can also be any conventional processor, etc. The processor 302 is a control center of the computing device 30, which uses various interfaces and lines to connect various parts of the entire computing device 3.

The memory 301 may be used to store the computer program 303, and the processor 302 implements the computing device by running or executing the computer program or module stored in the memory 301 and calling data stored in the memory 301 30 various functions. The memory 301 may include a storage program area and a storage data area. The storage program area may store an operating system, an application program required by at least one function (such as a sound playback function, an image playback function, etc.), etc.; the storage data area may data and the like created according to the use of the computing device 30 are stored. In addition, the memory 301 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 302 may be a central processing unit (CPU) or other general-purpose processor, a digital signal processor (DSP), an application specific integrated circuit (ASIC), a field-programmable gate array (FPGA) or other programmable logic device, a discrete gate, or a transistor logic device, or a discrete hardware component, etc. The processor 302 may be a microprocessor or any conventional processor. The processor 302 may be a control center of the computing device 30, and connect various parts of the entire computing device 30 by using various interfaces and lines.

The storage device 301 may be configured to store the computer program 303 and/or modules. The processor 302 may run or execute the computer-readable instructions and/or modules stored in the storage device 301, and may invoke data stored in the storage device 301 to implement various functions of the computing device 30. The storage device 301 may include a program storage area and a data storage area. The program storage area may store an operating system, an application program required for at least one function (such as a sound playback function, an image playback function), etc. The data storage area may store data created for using the computing device 30. In addition, the storage device 301 may include a random access memory, and may also include a non-transitory storage medium, such as a hard disk, an internal memory, a plug-in hard disk, a smart media card (SMC), and a secure digital (SD) card, a flash card, at least one disk storage device, a flash memory, or other non-transitory solid-state storage device.

When the modules integrated in the computing device 30 are implemented in the form of software functional units and used as independent units, they can be stored in a non-transitory readable storage medium. Based on this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the steps of the foregoing method embodiments. The computer-readable instructions include computer-readable instruction codes, and the computer-readable instruction codes can be source code, object code, an executable file, or in some intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

In several embodiments provided in the preset application, it should be understood that the disclosed computing device and method may be implemented in other ways. For example, the embodiment of the computing device described above is merely illustrative. For example, the units are only obtained by logical function divisions, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the processes of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but do not signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. An image comparison method, comprising:
    obtaining an original reference image and an original test image, wherein the original reference image is an image of a reference product, and the original test image is an image of a test product;
    binarizing the original reference image and the original test image to obtain a reference binary image and a test binary image;
    detecting edges of the reference binary image and the test binary image to obtain a reference edge image and a test edge image;
    performing a morphological expansion on the reference edge image to obtain an expanded reference edge image;
    performing an OR operation on the expanded reference edge image and the test edge image to obtain an expanded test edge image;
    performing an XOR operation on the expanded reference edge image and the expanded test edge image to obtain a difference image; and
    determining whether an appearance of the test product is same as an appearance of the reference product according to the difference image;
    wherein determining whether the appearance of the test product is the same as the appearance of the reference product according to the difference image comprises:
    calculating a sum of pixel values of the difference image;
    when the sum is greater than a preset threshold, determining that the appearance of the test product is not the same as the appearance of the reference product; and
    when the sum is less than or equal to the preset threshold, determining that the appearance of the test product is the same as the appearance of the reference product.

2. The image comparison method of claim 1, wherein before binarizing the original reference image and the original test image, the method further comprises:
converting the original reference image and the original test image into grayscale images.

3. The image comparison method of claim 1, wherein before binarizing the original reference image and the original test image, the method further comprises:
aligning the original reference image and the original test image.

4. The image comparison method of claim 1, wherein detecting edges of the reference binary image and the test binary image comprises:
detecting the edges of the reference binary image and the test binary image using a Canny edge detection algorithm.

5. The image comparison method of claim 1, wherein performing a morphological expansion on the reference edge image comprises:
obtaining a preset structural element; and
performing the morphological expansion on the reference edge image through the preset structural element.

6. The image comparison method of claim 1, further comprising:
when the appearance of the test product is the same as the appearance of the reference product, further determining that the test product is qualified; and
when the appearance of the test product is not the same as the appearance of the reference product, further determining that the test product is unqualified.

7. A computing device comprising:
at least one processor; and
a storage device storing computer-readable instructions, which when executed by the at least one processor, cause the at least one processor to:
obtain an original reference image and an original test image, wherein the original reference image is an image of a reference product, and the original test image is an image of a test product;
binarize the original reference image and the original test image to obtain a reference binary image and a test binary image;
detect edges of the reference binary image and the test binary image to obtain a reference edge image and a test edge image;
perform a morphological expansion on the reference edge image to obtain an expanded reference edge image;
perform an OR operation on the expanded reference edge image and the test edge image to obtain an expanded test edge image;
perform an XOR operation on the expanded reference edge image and the expanded test edge image to obtain a difference image; and
determine whether an appearance of the test product is same as an appearance of the reference product according to the difference image;
wherein the at least one processor determining whether the appearance of the test product is same as the appearance of the reference product according to the difference image comprises:
calculating a sum of pixel values of the difference image;
when the sum is greater than a preset threshold, determining that the appearance of the test product is not the same as the appearance of the reference product; and
when the sum is less than or equal to the preset threshold, determining that the appearance of the test product is the same as the appearance of the reference product.

8. The computing device of claim 7, wherein the at least one processor is further caused to:
convert the original reference image and the original test image into grayscale images.

9. The computing device of claim 7, wherein the at least one processor is further caused to:
align the original reference image and the original test image.

10. The computing device of claim 7, wherein the at least one processor is further caused to:
detect the edges of the reference binary image and the test binary image using a Canny edge detection algorithm.

11. The computing device of claim 7, wherein the at least one processor is further caused to:
obtain a preset structural element; and
perform the morphological expansion on the reference edge image through the preset structural element.

12. The computing device of claim 7, wherein the at least one processor is further caused to:
when the appearance of the test product is the same as the appearance of the reference product, further determine that the test product is qualified; and
when the appearance of the test product is not the same as the appearance of the reference product, further determine that test product is unqualified.

13. A non-transitory storage medium having stored thereon computer-readable instructions that, when the computer-readable instructions are executed by a processor to implement an image comparison method comprising:
obtaining an original reference image and an original test image, wherein the original reference image is an image of a reference product, and the original test image is an image of a test product;
binarizing the original reference image and the original test image to obtain a reference binary image and a test binary image;
detecting edges of the reference binary image and the test binary image to obtain a reference edge image and a test edge image;
performing a morphological expansion on the reference edge image to obtain an expanded reference edge image;
performing an OR operation on the expanded reference edge image and the test edge image to obtain an expanded test edge image;
performing an XOR operation on the expanded reference edge image and the expanded test edge image to obtain a difference image; and
determining whether an appearance of the test product is same as an appearance of the reference product according to the difference image;
wherein determining whether the appearance of the test product is the same as the appearance of the reference product according to the difference image comprises:
calculating a sum of pixel values of the difference image;
when the sum is greater than a preset threshold, determining that the appearance of the test product is not the same as the appearance of the reference product; and
when the sum is less than or equal to the preset threshold, determining that the appearance of the test product is the same as the appearance of the reference product.

14. The non-transitory storage medium of claim 13, wherein before binarizing the original reference image and the original test image, the method further comprises:
aligning the original reference image and the original test image.

15. The non-transitory storage medium of claim 13, wherein detecting edges of the reference binary image and the test binary image comprises:
   detecting the edges of the reference binary image and the test binary image using a Canny edge detection algorithm.

16. The non-transitory storage medium of claim 13, wherein performing a morphological expansion on the reference edge image comprises:
   obtaining a preset structural element; and
   performing the morphological expansion on the reference edge image through the preset structural element.

17. The non-transitory storage medium of claim 13, wherein the method further comprises:
   when the appearance of the test product is the same as the appearance of the reference product, further determining that the test product is qualified; and
   when the appearance of the test product is not the same as the appearance of the reference product, further determining that test product is unqualified.

* * * * *